United States Patent
Berry et al.

(10) Patent No.: US 11,157,586 B2
(45) Date of Patent: Oct. 26, 2021

(54) SCOPING SEARCHES WITHIN WEBSITES

(71) Applicant: International Business Machines Corporation, Armonk, NY (US)

(72) Inventors: Christopher J. Berry, Cammeray (AU); Mark C. Hampton, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 15/788,965

(22) Filed: Oct. 20, 2017

(65) Prior Publication Data

US 2018/0060447 A1    Mar. 1, 2018

Related U.S. Application Data

(63) Continuation of application No. 13/740,429, filed on Jan. 14, 2013, now Pat. No. 9,881,100.

(51) Int. Cl.
    *G06F 16/957*      (2019.01)

(52) U.S. Cl.
    CPC .................. *G06F 16/957* (2019.01)

(58) Field of Classification Search
    CPC ...... G06F 16/90; G06F 16/953; G06F 16/954; G06F 16/957
    See application file for complete search history.

(56) References Cited

U.S. PATENT DOCUMENTS

| | | | |
|---|---|---|---|
| 5,890,147 A | * | 3/1999 | Peltonen ................. G06F 16/10 707/E17.008 |
| 6,359,637 B1 | * | 3/2002 | Perkins ............... G06F 16/9027 707/E17.012 |
| 6,823,491 B1 | | 11/2004 | McBrearty et al. |
| 6,963,867 B2 | | 11/2005 | Ford et al. |
| 7,305,401 B2 | | 12/2007 | Keith, Jr. |
| 7,870,474 B2 | | 1/2011 | Chakrabarti et al. |
| 7,958,143 B1 | | 6/2011 | Amacker |
| 7,984,041 B1 | | 7/2011 | Patil |
| 8,185,512 B2 | | 5/2012 | Brodfuehrer et al. |
| 8,271,474 B2 | | 9/2012 | Walker et al. |
| 8,682,881 B1 | | 3/2014 | Xu et al. |
| 9,881,100 B2 | | 1/2018 | Berry et al. |

(Continued)

FOREIGN PATENT DOCUMENTS

WO     20120155147 A2    11/2012

OTHER PUBLICATIONS

"RecipeSource," http://recipesource.com/ retrieved from WayBack Machine, Jan. 3, 2012, pp. 1-4.

(Continued)

*Primary Examiner* — Ashish Thomas
*Assistant Examiner* — Jedidiah P Ferrer
(74) *Attorney, Agent, or Firm* — Teddi E. Maranzano

(57) ABSTRACT

A computer-implemented method, computer program product, and computing system is provided for scoping searches within a website. In an implementation, a method may receiving a search request. The method may also include identifying a location of a search scoping feature within a website hierarchy. The method may further include setting a search scope relative to the search request based on, at least in part, the location of the search scoping feature.

21 Claims, 5 Drawing Sheets

(56) References Cited

U.S. PATENT DOCUMENTS

| | | | |
|---|---|---|---|
| 2002/0147880 A1* | 10/2002 | Wang Baldonado | ........................ G06F 16/951 707/E17.108 |
| 2005/0028089 A1 | 2/2005 | Aoki et al. | |
| 2006/0294070 A1 | 12/2006 | Mcroberts et al. | |
| 2007/0061308 A1 | 3/2007 | Hartwell et al. | |
| 2007/0226187 A1 | 9/2007 | Beatty et al. | |
| 2008/0306927 A1 | 12/2008 | Hoernkvist | |
| 2009/0044150 A1 | 2/2009 | Liu et al. | |
| 2010/0082670 A1 | 4/2010 | Chan et al. | |
| 2010/0131531 A1 | 5/2010 | Mason et al. | |
| 2011/0106888 A1 | 5/2011 | Wilson et al. | |
| 2011/0302145 A1 | 12/2011 | Brown et al. | |
| 2012/0221551 A1* | 8/2012 | Ripsher | ................. G06F 16/951 707/722 |
| 2012/0278299 A1 | 11/2012 | Liao et al. | |
| 2015/0113019 A1* | 4/2015 | Jiang | ................... G06F 16/9535 707/709 |

OTHER PUBLICATIONS

Hearst, "Next Generation Web Search: Setting Our Sites," 2000, bulletin of the IEEE Computer Society Technical Committee on Data Engineering, pp. 38-48.

Rosenfeld, "Search Analytics for Your Site," Jul. 6, 2011, O'Reilly Media, Inc., pp. 1-9.

* cited by examiner

SCOPING SEARCHES WITHIN WEBSITES

RELATED APPLICATIONS

The subject application is a continuation application of U.S. patent application with Ser. No. 13/740,429, filed on Jan. 14, 2013, the entire contents of which are herein incorporated by reference.

TECHNICAL FIELD

The present disclosure generally relates to systems and method for scoping searches within websites.

BACKGROUND

Websites are commonly used by both individuals and businesses to publish information that may be easily accessed from a multitude of network connected devices. Increasingly, a vast array of tools are available that may allow individuals to create websites without requiring a substantial amount of knowledge about the underlying code or data structures associated with a website. Such tools often make use of templates that may allow drag-and-drop webpage creation, in which a user may simply drag desired pieces of content to a desired location on a website, and the tool may automatically generate the corresponding code for generating the webpage. However, with more aspects of website creation falling onto non-technical people, a gap has appeared around the configuration of more complex aspects of the website. These more complex aspects of the website may be outside of the capabilities of common website creation tools and/or may require a higher degree of technical knowledge on the part of the website creator to properly implement.

SUMMARY OF DISCLOSURE

According to an implementation, a computer-implemented method may include receiving a search request. The method may also include identifying a location of a search scoping feature within a website hierarchy. The method may further include setting a search scope relative to the search request based on, at least in part, the location of the search scoping feature.

One or more of the following features may be included. The method may also include determining a current page within the website hierarchy from which the search request is received. The method may also include acquiring one or more children pages of the current page. Identifying the location of the search scoping feature may include identifying the location of the search scoping feature within the one or more children pages. Setting the search scope may include executing the search request on the current page and the one or more children pages.

The method may also include identifying a parent page of the current page, and acquiring one or more children pages of the parent page. Identifying the location of the search scoping feature may include identifying the location of the search scoping feature within the one or more children pages. Setting the search scope may include executing the search request one the parent page and the one or more children pages.

The method may also include directing search results to a webpage associated with the search scoping feature.

According to another implementation a computer program product includes a computer readable medium having a plurality of instructions stored on it. When executed by a processor, the instructions may cause the processor to perform operations including receiving a search request. Instructions may also be included for identifying a location of a search scoping feature within a website hierarchy. Instructions may further be included for setting a search scope relative to the search request based on, at least in part, the location of the search scoping feature.

One or more of the following features may be included. Instructions may be included for determining a current page within the website hierarchy from which the search request is received. Instructions may be included for acquiring one or more children pages of the current page. Identifying the location of the search scoping feature may include identifying the location of the search scoping feature within the one or more children pages. The instructions for setting the search scope may include instructions for executing the search request on the current page and the one or more children pages.

Instructions may be included for identifying a parent page of the current page, and for acquiring one or more children pages of the parent page. Identifying the location of the search scoping feature may include identifying the location of the search scoping feature within the one or more children pages. The instructions for setting the search scope may include instructions for executing the search request one the parent page and the one or more children pages.

Instructions may be included for directing search results to a webpage associated with the search scoping feature.

According to another implementation, a computing system includes a processor device. The processor device may be configured to receive a search request. The processor may also be configured to identify a location of a search scoping feature within a website hierarchy. The processor may further be configured to set a search scope relative to the search request based on, at least in part, the location of the search scoping feature.

One or more of the following features may be included. The processor device may be further configured to determine a current page within the website hierarchy from which the search request is received. The processor device may be further configured to acquire one or more children pages of the current page. Identifying the location of the search scoping feature may include identifying the location of the search scoping feature within the one or more children pages. Setting the search scope may include executing the search request on the current page and the one or more children pages.

The processor device may be further configured to identify a parent page of the current page, and to acquire one or more children pages of the parent page. Identifying the location of the search scoping feature may include identifying the location of the search scoping feature within the one or more children pages. Setting the search scope may include instructions for executing the search request one the parent page and the one or more children pages.

The processor device may be further configured to direct search results to a webpage associated with the search scoping feature.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
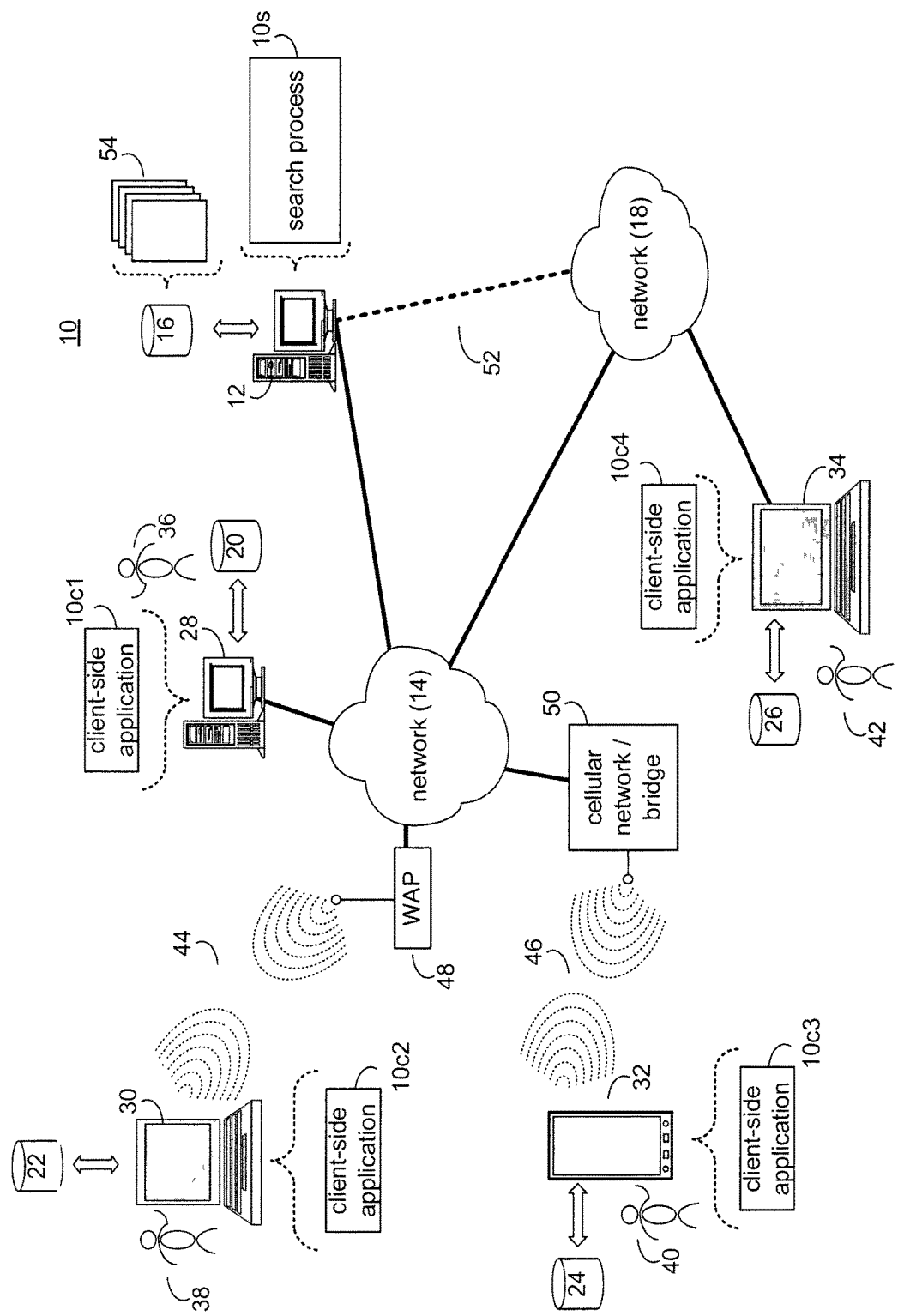
FIG. 1 is a diagrammatic view of a distributed computing network including a computing device that executes a search process according to an implementation of the present disclosure.

Referring to FIG. 1, there is shown search process 10. For the following discussion, it is intended to be understood that search process 10 may be implemented in a variety of ways. For example, search process 10 may be implemented as a server-side process, a client-side process, or a server-side/client-side process.

For example, search process 10 may be implemented as a purely server-side process via search process 10s. Alternatively, search process 10 may be implemented as a purely client-side process via one or more of client-side application 10c1, client-side application 10c2, client-side application 10c3, and client-side application 10c4. Alternatively still, search process 10 may be implemented as a server-side/client-side process via search process 10s in combination with one or more of client-side application 10c1, client-side application 10c2, client-side application 10c3, and client-side application 10c4. In such an example, at least a portion of the functionality of search process 10 may be performed by search process 10s and at least a portion of the functionality of search process 10 may be performed by one or more of client-side application 10c1, 10c2, 10c3, and 10c3.

Accordingly, search process 10 as used in this disclosure may include any combination of search process 10s, client-side application 10c1, client-side application 10c2, client-side application 10c3, and client-side application 10c4.

Figure 2:
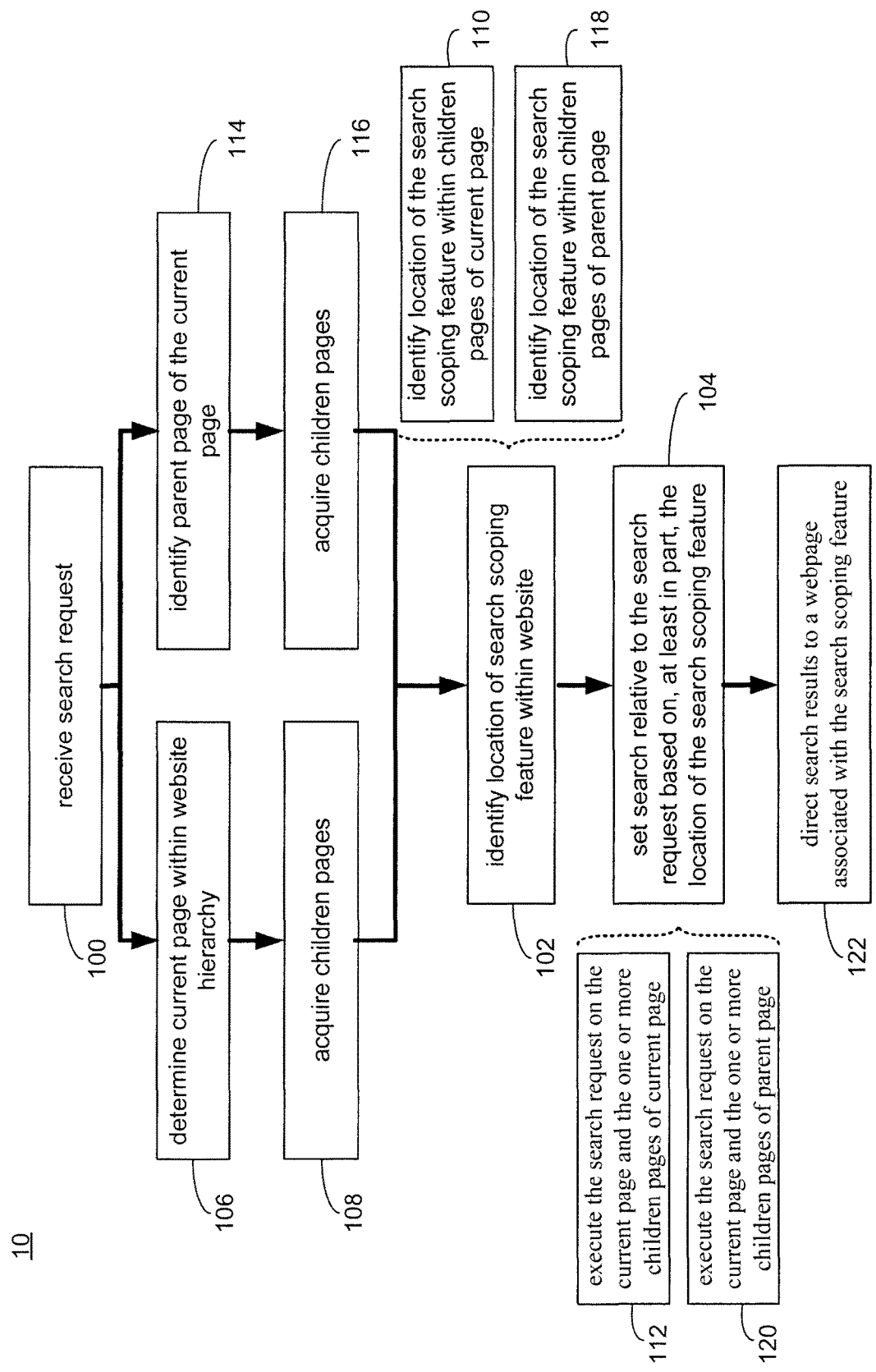
FIG. 2 is a flowchart of the search process of FIG. 1, according to an implementation of the present disclosure.

Referring also to FIG. 2, and as will be discussed in greater detail below, search process 10 may generally receive 100 a search request. Search process 10 may also identify 102 a location of a search scoping feature within a website hierarchy. Search process 10 may further set 104 a search scope relative to the search request based on, at least in part, the location of the search scoping feature.

Search process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of search process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a webpage authoring application, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access search process 10 directly through network 14 or through secondary network 18. Further, search process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, search process 10 may communicate with, interact with, and/or include a component, module, and/or logic implemented by a website (e.g., website 54, which may include a plurality of webpages, e.g., that may be organized in a hierarchical manner in website 54). Website 54 may be stored, for example, on storage device 16 coupled to computing device 12, and may be accessed by a client application (e.g., one or more of client applications 10c1-10c4, which may include web browsers and/or other suitable applications). One or more of users 36, 38, 40, 42 may access website 54 via one or more respective client electronic devices (e.g., client electronic devices 28, 30, 32, 34).

In some implementations, search process 10 may facilitate hierarchically aware scoping of searches within a website. For example, the scope of results from a search query that may be considered valuable and/or most valuable may vary depending upon a location from which the search was requested. Using a news website for the purpose of illustration, a search request may be made from within the finance section of the website, for example. In such a situation, based on the search having been made from within the finance section, the user may consider search results from within the finance section of the news web site to be of greater interest than, for example, search results from within the entertainment section of the news web site. As web site authoring and maintenance is increasing undertaken by individuals having limited technical knowledge, e.g., in terms of code authoring and the like, configuring appropriate search scoping may be challenging. Consistent with some embodiments, search process 10, which may provide a hierarchically aware search tool, may be used in conjunction with search scoping features that may be placed within a website hierarchy to facilitate a user defining desired search scoping within the website. In some embodiments, the search scoping feature may include, for example, a search template that may include pre-configured content and components that may be created under any part of the website hierarchy, and that may allow a search to be scoped based on, at least in part, the existence of such a search template. In some embodiments, by using existence of the search scoping feature as a determinant of the search scoping function, it may be possible to offer more fine grained control over how searches behave (e.g., how searches are scoped) in certain parts of the site. For example, if a user creating a portion of the web site wants a certain part of the web site to feature scoped search, then the user may use a template search page to create a new search page in that area (e.g., hierarchical region) of the web site to achieve the desired scoping of any searches conducted within that area of the website.

As generally discussed above, search process 10 may receive 100 a search request. Search process 10 may also identify 102 a location of a search scoping feature within a website hierarchy. Search process 10 may further set 104 a search scope relative to the search request based on, at least in part, the location of the search scoping feature.

For example, search process 10 may receive 100 a search request. The search request may include, for example, a search query input by a user (e.g., a visitor to a website, such as website 54), and an input requesting that a search relative to the query be conducted. For example, and as is widely known, many websites may include a search bar located on most and/or all webpages of the website. The search bar may include, for example, a text input box that may allow a visitor to the website to input a search query. The search bar may also include a search button that, in response to the visitor inputting text into the text box and selecting (e.g., via a mouse or other suitable input device, not shown) the search button may result in search process 10 receiving 100 a search request relative to the input search query.

As generally discussed above, in some instances a website may be configured to scope the results of a search relative to a specific area of a website (e.g., a specific hierarchical or structural area of the website). In some embodiments, a user creating the website may configure the capability of scoped searches through the user of search scoping features, such as search templates (e.g., which may include pages that may be configured for displaying search results within a given area of the website), that may be placed within the website hierarchy or structure. As generally discussed above, search process 10 may scope a search of the website based on, at least in part, the existence of such a search scoping feature. Accordingly, search process 10 may identify 102*a* location of a search scoping feature within a web site hierarchy.

In some embodiments, search process 10 may represent a hierarchically aware search component. In such an embodiment search process 10 may determine 106 a current page (e.g., the currently accessed or displayed page from which the search request was received). For example, search process 10 may determine 106 the current page within a hierarchical structure of a website. Further, search process 10 may acquire 108 one or more children pages of the current page. For example, as is generally know, a website may include a hierarchical structure in which various webpages of the website may be children, or subsidiary, pages of a webpage (e.g., the current page). Accordingly, search process 108 may acquire the children, or subsidiary, pages relative to the current webpage within the hierarchical structure of the website.

Identifying 102 the location of the search scoping feature may include identifying 110 the location of the search scoping feature within the one or more children pages. For example, search process 10 may examine the current webpage and the children pages to determine if the current page and/or a child page of the current page includes the search scoping feature. If the current page and/or a child page of the current page include a search scoping feature (such as a search template page), search process 10 may set 104 a search scope relative to the search request based on, at least in part, the location of the search scoping feature within the current page and/or the children pages. For example, based on the existence of the search scoping feature within the current page and/or a child page of the current page, search process may set 104 the search scope to include the current page and the children pages. In such an embodiment, setting 104 the search scope based on the location of the search scoping feature may include executing the search request on the current page and the one or more children. As such, search process 10 may search the current page and the children pages for the search query.

In an embodiment, search process 10 may identify 114 a parent page of the current page. For example, the current page (e.g., the currently accessed or displayed webpage from with the search request was received) and the children of the current page may not include a search scoping feature. In such an embodiment, search process 10 may identify 114 a parent page the current page. The parent page may include the next page up on the hierarchical structure of the web site. Further, search process 10 may also acquire 116 one or more children pages of the parent page. For example, based on the hierarchical structure of the website, search process 10 may acquire all children, or subsidiary, pages of the parent page (e.g., which may also include the current page).

Continuing with the foregoing, identifying 102 the location of the search scoping feature may include identifying 118 the location of the search scoping feature within the one or more children pages. For example, search process 10 may examine the parent page and the children pages of the parent page to determine if the parent page and/or a child page of the parent page include the search scoping feature. If the parent page and/or a child page of the parent page include the search scoping feature, search process 10 may identify 118 the location of the search scoping feature within the parent page and/or the one or more children pages. Search process 10 may further set the scope of the search relative to the search request based on, at least in part, the location of the search scoping feature within the parent page and/or one of the children pages of the parent page. In such a situation, setting 104 the search scope may include executing 120 the search request on the parent page and the one or more children pages.

Further, search process 10 may also direct 122 search results to a webpage associated with the search scoping feature. For example, in an embodiment in which the search scoping feature may include a search page template, the search page template may be configured for displaying the results of a search executed with respect to the received 100 search request. In such an embodiment, search process 10 may direct 122 the search results to the search page template, e.g., which may be configured for displaying the results of the search.

Figure 3:
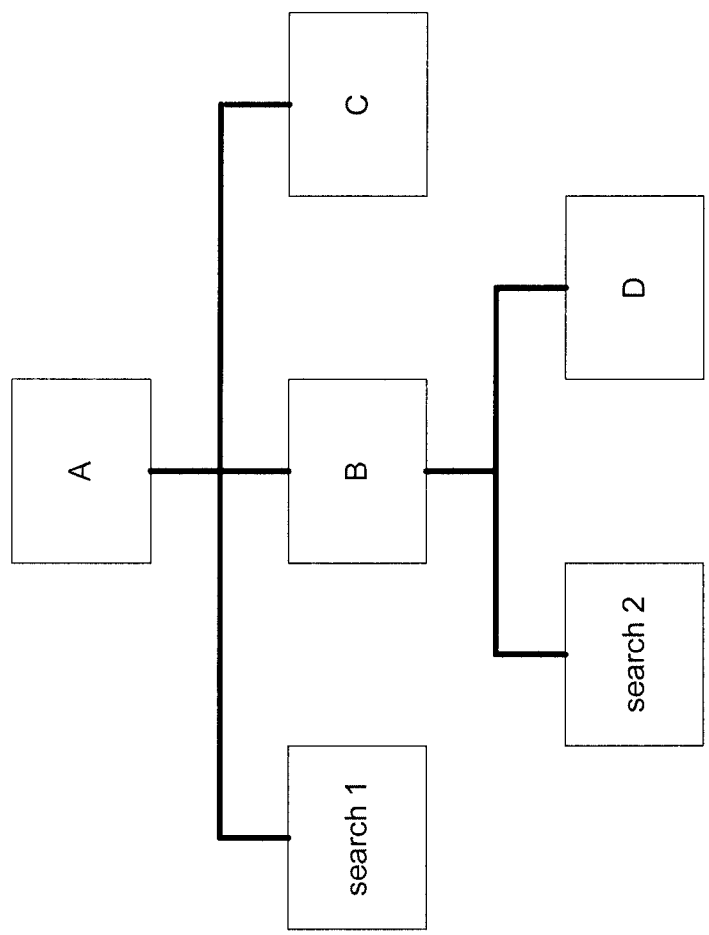
FIG. 3 is a diagrammatic representation of hierarchical structure of a website that may be implemented in connection with the search process of FIG. 1, according to an implementation of the present disclosure.
Figure 4:
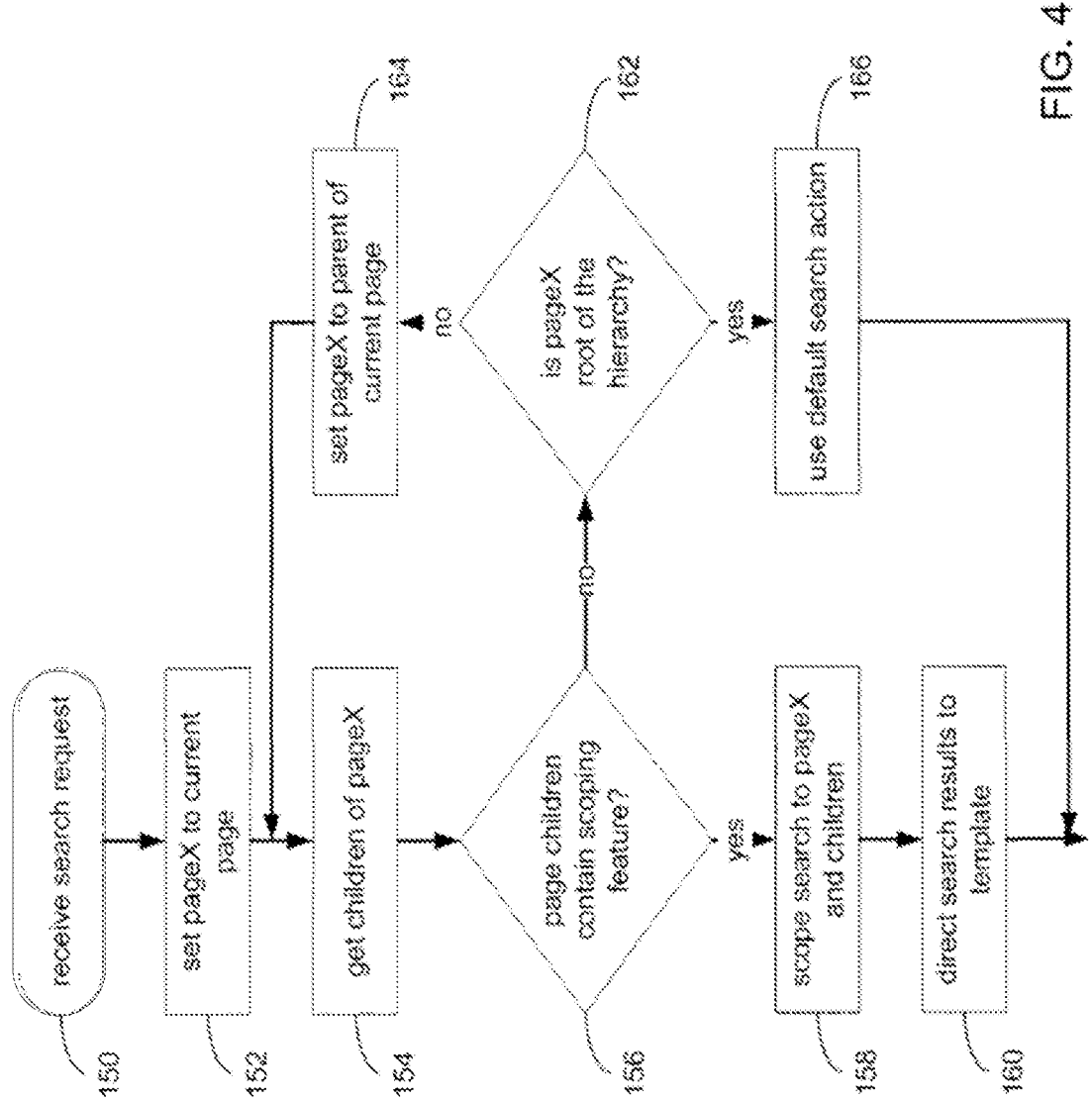
FIG. 4 is a flow chart of an example embodiment of a search process of FIG. 1, according to an implementation of the present disclosure

Referring also to FIGS. 3 and 4 a particular illustrative example is depicted. As shown in FIG. 3, website 54 may have a generally hierarchical structure, for example, in which webpage A may be a root, or top tier webpage in the web site. For example, in the previously described illustrative example of a news website, webpage A may include a main page of the web site. Further, webpage A may include one or more children pages, e.g., search 1, webpage B and webpage C in the illustrated example. Search 1 may include, for example, a search template that may be placed in the hierarchy of website 54 for scoping searches. Webpages B and C may include, for example, section main pages corresponding to various sections of the website (e.g., the finance section and the entertainment sections of the illustrative news website). Further, one or more of the children pages of webpage A may include further subsidiary, or children pages. For example, as shown webpage B may include children pages search 2 and webpage D. Search 2 may include, for example, a search template that may be created within the hierarchy of website 54 for the purpose of enabling scoped searches within sub-hierarchy B. Further, webpage D may include, for example, an article or other content or sub-directory page under webpage B.

Referring also to FIG. 4, a further illustrative process implemented by search process 10 is depicted. With respect to webpage 54, search process 10 may receive 150 a search request when webpage A is a currently accessed or displayed webpage. Search process 10 may set 152 pageX (e.g., the page with respect to which searches may be scoped) to the current page (i.e., webpage A). Search process 10 may further get 154 children of pageX (i.e., of the current page, webpage A), which may include webpages search 1, webpage B, webpage C, search 2, and webpage D. Search process 10 may further determine 156 if pageX or the children of pageX contain a scoping feature (e.g., a search template page, designated search 1 and search 2 in webpage 54 of FIG. 3). As the children of webpage A (which is set to pageX in the instant example) includes Search 1 at a first subsidiary hierarchical level, the children of webpage A contain a scoping feature. Accordingly, search process 10 may scope 158 the search to pageX and the children pages. As such, search process 10 may execute the received 150 search request on webpage A and the children pages of webpage A (i.e., search process 10 may search webpage A and the children webpages for the requested search query). Further, search process 10 may direct 160 the search results to a search template, e.g., search 1.

In a further example, search process 10 may receive 150 a search request from webpage B. Search process 10 may set pageX to the current page (e.g., webpage B), and may get 154 the children of pageX (e.g., webpage B), namely search 2 and webpage D. Search process 156 may determine that the page children of pageX (e.g., webpage B) contain a scoping feature (e.g., search 2). As such, search process 10 may scope 158 the search to pageX (e.g., webpage B in the instant example), and may direct 160 the search results to a search template (e.g., search 2).

In an example in which search process 10 may receive 150 a search request from webpage C, search process 10 may set pageX to the current page (e.g., webpage C), and may get 154 the children of pageX (e.g., webpage C). However, in the illustrated example webpage C may not include any children pages. Search process 10 may determine 156 that the page children of webpage C doe not contain a scoping feature. As such, search process 10 may determine 162 if pageX (e.g., webpage C) is a root of the hierarchy (i.e., a top tier webpage in the website hierarchy). In the instant example, search process 10 may determine 162 that pageX, (being set to webpage C) is not a root of the hierarchy. Accordingly, search process 10 may set pageX to the parent of the current page (i.e., may set pageX to webpage A as the parent of webpage C). With pageX set to webpage A, search process may proceed in the manner described above with respect to a search request received 150 when webpage A is the currently accessed or displayed webpage.

In an example in which search process 10 may receive 150 a search request from webpage D, search process 10 may set pageX to be webpage D, as the current webpage, and may get the children of pageX (e.g., of webpage D, which may not include any children pages in the illustrated example). Search process 10 may determine 156 that pageX (e.g., webpage D) does not contain a scoping feature. Search process 10 may further determine 162 that pageX (e.g., webpage D) is not the root of the hierarchy, and may, therefore, set 164 pageX to the parent of the current webpage (i.e., may set pageX to webpage B as the parent of webpage D). With pageX set to webpage B, as the parent of webpage D, search process 10 may proceed in the manner described above in the example in which search process 10 may receive 150 a search request from webpage B.

While not shown, in an example in which a child page of a current webpage may not contain a scoping feature and the children of the parent of the current webpage also does not contain a scoping feature, search process 10 may set 164 pageX to the parent of the parent of the current page, and so forth, until a child page is determined 156 to contain a scoping feature or until search process 10 determined 162 that pageX is the root of the hierarchy. If search process 10 determines 162 that pageX is the root of the hierarchy, search process 10 may use 166 a default search action. An example of a default search action may include, for example, conducting a global search of website 54 with respect to the query of the received 150 search request. Other default search actions may similarly be utilized.

Figure 5:
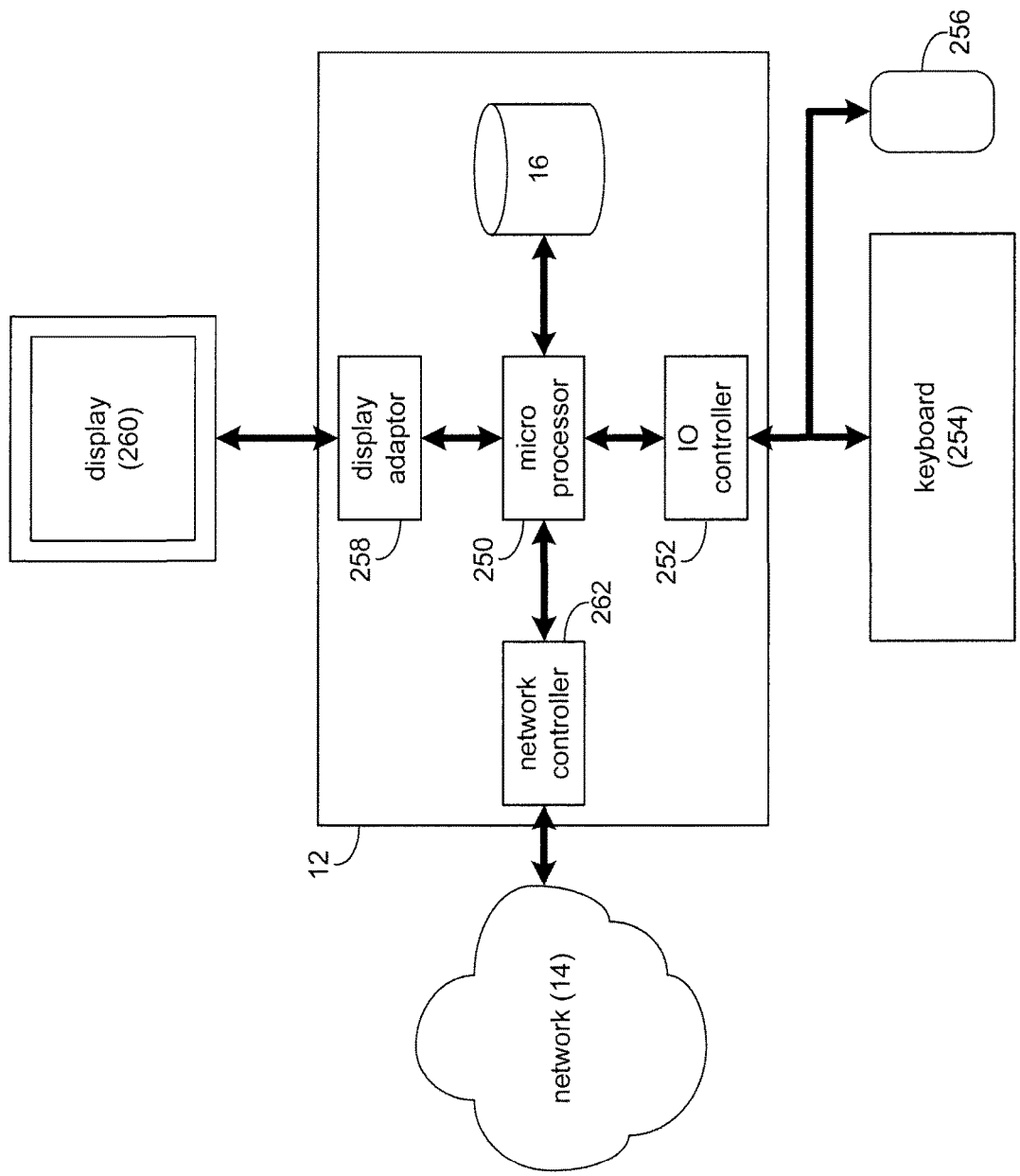
FIG. 5 is a diagrammatic view of the computing device of FIG. 1, according to an implementation of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, search process 10 may be substituted for computing device 12 within FIG. 5, examples of which may include but are not limited to client electronic devices 28, 30, 32, 34.

Computing system 12 may include microprocessor 250 configured to e.g., process data and execute instructions/code for screen capture process 10. Microprocessor 250 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. 10 controller 252 may be configured to couple microprocessor 250 with various devices, such as keyboard 254, mouse 256, USB ports (not shown), and printer ports (not shown). Display adaptor 258 may be configured to couple display 260 (e.g., a CRT or LCD monitor) with microprocessor 250, while network adapter 262 (e.g., an Ethernet adapter) may be configured to couple microprocessor 250 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#, NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 250) of a general purpose computer/special purpose computer/other programmable data processing apparatus (e.g., computing device 12), such that the instructions, which execute via the processor (e.g., processor 250) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, via a computing device, a search request from a first search template page;
identifying, via the computing device, a location of the first search template page within a hierarchical structure of a website;
determining that the first search template page lacks a child page, at a first subsidiary hierarchical level relative to the first search template page, that includes a second search template page for enabling scoped searches within a sub-hierarchy of the first subsidiary hierarchical level within the hierarchical structure of the website;
determining that the first search template page is not a root of the hierarchical structure of the website, wherein the root of the hierarchical structure of the website is a top tier webpage in the hierarchical structure of the website; and
setting, via the computing device, a search scope relative to the search request based on, at least in part, the location of the first search template page within the hierarchical structure of the website and the lack of a child page that includes the second search template page.

2. The computer-implemented method of claim 1, further including determining a current page within the hierarchical structure of the website from which the search request is received.

3. The computer-implemented method of claim 2, further including acquiring one or more children pages of the current page, wherein identifying the location of the first search template page includes identifying the location of the first search template page within the one or more children pages.

4. The computer-implemented method of claim 3, wherein setting the search scope includes executing the search request on the current page and the one or more children pages.

5. The computer-implemented method of claim 2, further including identifying a parent page of the current page, and acquiring one or more children pages of the parent page, wherein identifying the location of the first search template page includes identifying the location of the first search template page within the one or more children pages.

6. The computer-implemented method of claim 5, wherein setting the search scope includes executing the search request on the parent page and the one or more children pages.

7. The computer-implemented method of claim 1, further including directing search results to a webpage associated with the first search template page.

8. A computer program product comprising a non-transitory computer readable medium having a plurality of instructions stored thereon, which, when executed by a processor, cause the processor to perform operations including:
receiving a search request from a first search template page;
identifying a location of the first search template page within a hierarchical structure of a website;
determining that the first search template page lacks a child page, at a first subsidiary hierarchical level relative to the first search template page, that includes a second search template page for enabling scoped searches within a sub-hierarchy of the first subsidiary hierarchical level within the hierarchical structure of the website;
determining that the first search template page is not a root of the hierarchical structure of the website, wherein the root of the hierarchical structure of the website is a top tier webpage in the hierarchical structure of the website; and
setting a search scope relative to the search request based on, at least in part, the location of the first search template page within the hierarchical structure of the website and the lack of a child page that includes the second search template.

9. The computer program product of claim 8, further including instructions for determining a current page within the hierarchical structure of the website from which the search request is received.

10. The computer program product of claim 9, further including instructions for acquiring one or more children pages of the current page, wherein identifying the location of the first search template page includes identifying the location of the first search template page within the one or more children pages.

11. The computer program product of claim 10, wherein the instructions for setting the search scope include instructions for executing the search request on the current page and the one or more children pages.

12. The computer program product of claim 9, further including instructions for identifying a parent page of the current page, and acquiring one or more children pages of the parent page, wherein identifying the location of the first search template page includes identifying the location of the first search template page within the one or more children pages.

13. The computer program product of claim 12, wherein the instructions for setting the search scope include instructions for executing the search request on the parent page and the one or more children pages.

14. The computer program product of claim 8, further including instructions for directing search results to a webpage associated with the search scoping feature.

15. A computing system comprising a processor device and programming instructions stored on a non-transitory storage medium, the programming instructions being executable by the processor device to cause the processor device to:
- receive a search request from a first search template page;
- identify a location of the first search template page within a hierarchical structure of a website; and
- determine that the first search template page lacks a child page, at a first subsidiary hierarchical level relative to the first search template page, that includes a second search template page for enabling scoped searches within a sub-hierarchy of the first subsidiary hierarchical level within the hierarchical structure of the website;
- determine that the first search template page is not a root of the hierarchical structure of the website, wherein the root of the hierarchical structure of the website is a top tier webpage in the hierarchical structure of the website; and
- set a search scope relative to the search request based on, at least in part, the location of the first search template page within the hierarchical structure of the website and the lack of a child page that includes the second search template page.

16. The computing system of claim 15, wherein the programming instructions further comprise instructions to cause the processor device to determine a current page within the hierarchical structure of the website from which the search request is received.

17. The computing system of claim 16, wherein the programming instructions further comprise instructions to cause the processor device to acquire one or more children pages of the current page, wherein identifying the location of the first search template page includes identifying the location of the first search template page within the one or more children pages.

18. The computing system of claim 17, wherein setting the search scope includes executing the search request on the current page and the one or more children pages.

19. The computing system of claim 16, wherein the programming instructions further comprise instructions to cause the processor device to identify a parent page of the current page, and acquire one or more children pages of the parent page, wherein identifying the location of the first search template page includes identifying the location of the first search template page within the one or more children pages.

20. The computing system of claim 19, wherein setting the search scope includes instructions for executing the search request on the parent page and the one or more children pages.

21. The computing system of claim 15, wherein the programming instructions further comprise instructions to cause the processor device to direct search results to a webpage associated with the search scoping feature.

* * * * *